Nov. 22, 1927. 1,650,302

R. SCOTT ET AL

NONSKID DEVICE FOR CHAINS

Filed Dec. 21, 1925

ROBERT SCOTT
GEORGE HENRY POULTON
INVENTOR.

BY Harold C. Shipman
ATTORNEY.

Patented Nov. 22, 1927.

1,650,302

UNITED STATES PATENT OFFICE.

ROBERT SCOTT AND GEORGE HENRY POULTON, OF WINNIPEG, MANITOBA, CANADA.

NONSKID DEVICE FOR CHAINS.

Application filed December 21, 1925. Serial No. 76,729.

Our present invention appertains generally to improvements in the art of chains for vehicle tires and specifically to a device for use in conjunction therewith for preventing side skidding.

The object of our invention is to provide a non-skid device particularly adapted for use in connection with motor vehicle wheels which will prevent the wheel to which the same are attached from skidding laterally.

Among other aims and objects of our invention may be cited the provision of a device of this character in which the number of parts are few, the construction simple and the cost of protection moderate.

With the foregoing and other objects in view which will appear more fully as the description proceeds, the invention resides in the novel combination and arrangement of co-operating elements as hereinafter more specifically set forth, claimed and shown in the accompanying drawings, forming a part of the present application, and in which:

Like numerals of reference designate corresponding components throughout the views.

Our invention is adapted for use on either solid or pneumatic motor vehicle tires and may be constructed as a chain unit or may be connected to those types of chains now commercially available. It comprises a section of chain 4 formed of a plurality of links and a pair of anti-skidding devices 5 and 6. Each of these devices is formed from sheet metal which is bent in substantially U-channel shape, the ends of the links forming the chain being extended therethrough and securely engaged therewith as clearly shown in Fig. 3.

Figure 1:
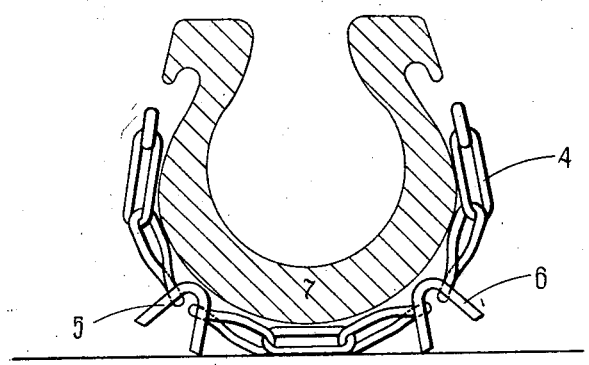
Fig. 1 is a sectional view illustrating the application of our invention to a pneumatic tire.
Figure 2:
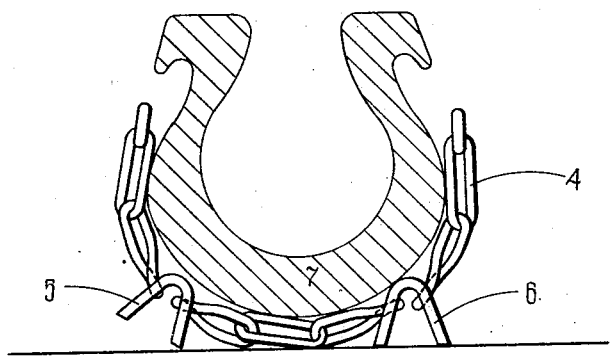
Fig. 2 is a similar view illustrating the position of the non-skid device when the wheel is skidding to the right hand.

The normal position of the anti-skid devices 5 and 6, is shown in Fig. 1 on the tire 7. When the tire skids laterally, for instance to the right as shown in Fig. 2, side pressure forces the anti-skid device so that the edges thereof bear upon the surface of the road as shown in Fig. 2 and grip the same, preventing continued skidding.

Figure 3:
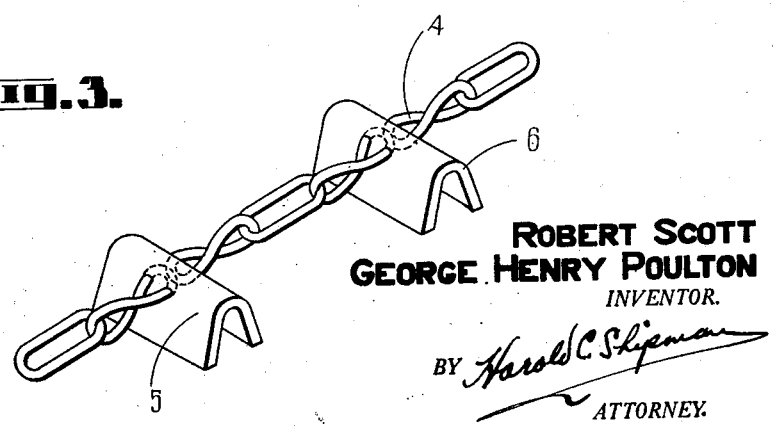
Fig. 3 is a perspective view of the device attached from the Weed chain.

It is of course apparent that our invention may be incorporated in a chain or may be manufactured in single units corresponding to that shown in Fig. 3, so that it may be attached to Weed chains now in use.

While the preferred embodiment of the invention has been described, it is to be understood that minor changes in the details of construction, combination and arrangement of co-operating elements may be resorted to within the scope of what is claimed without departing from the spirit of the invention.

What we claim as new is:

An anti-skid device for automobile chains, comprising transverse link sections; an intermediate link section; inverted U-shaped channel members, having flat ends, interconnected between each of said sections and said intermediate section; said connection to said U-shaped channel members being at the upper rounded portion thereof so as to leave both outwardly, directed, spaced ends free.

In testimony whereof, we affix our signatures.

ROBERT SCOTT.
GEORGE HENRY POULTON.